(12) United States Patent
Faven et al.

(10) Patent No.: US 12,670,341 B2
(45) Date of Patent: Jun. 30, 2026

(54) ICC READER

(71) Applicant: THALES DIS FRANCE SAS, Meudon (FR)

(72) Inventors: Frédéric Faven, La Ciotat (FR); Jean-François Schuh, La Ciotat (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 18/694,020

(22) PCT Filed: Sep. 13, 2022

(86) PCT No.: PCT/EP2022/075435
§ 371 (c)(1),
(2) Date: Mar. 21, 2024

(87) PCT Pub. No.: WO2023/046537
PCT Pub. Date: Mar. 30, 2023

(65) Prior Publication Data
US 2024/0330612 A1 Oct. 3, 2024

(30) Foreign Application Priority Data
Sep. 21, 2021 (EP) ..................................... 21306301

(51) Int. Cl.
*G06K 7/00* (2006.01)
*H04L 9/32* (2006.01)

(52) U.S. Cl.
CPC .......... *G06K 7/0091* (2013.01); *H04L 9/3234* (2013.01)

(58) Field of Classification Search
CPC ...... G06K 7/0091; G06K 19/00; G06K 19/07; H04L 9/3234; G06Q 20/34; G06Q 20/341
(Continued)

(56) References Cited

U.S. PATENT DOCUMENTS

2004/0215471 A1* 10/2004 Tamagno ............ G06F 11/3656
717/124
2004/0249625 A1* 12/2004 Leaming ............ G06K 19/0719
703/27
(Continued)

FOREIGN PATENT DOCUMENTS

CN 1716172 A * 1/2006
EP 1139226 A1 10/2001
(Continued)

OTHER PUBLICATIONS

International Search Report (PCT/ISA/210) and Written Opinion (PCT/ISA/237) mailed on Dec. 15, 2022 by the European Patent Office as the International Searching Authority for current International Application No. PCT/EP2022/075435—[11 pages].

*Primary Examiner* — Edwyn Labaze

(57) ABSTRACT

The present disclosure provides an ICC reader including a microcontroller configured to exchange data with an insertable ICC while the insertable ICC is inserted and powered, and with an end-user entity, an ICC connector configured to allow the exchange of data between the microcontroller and the inserted ICC, and an end-user entity interface connector configured to allow the exchange of data between the microcontroller and an end-user entity, wherein the ICC reader further includes an activatable 2-position built-in switch defining two states: a first state wherein the exchange of data between the microcontroller and the inserted ICC is allowed, and a second state wherein the exchange of data between the microcontroller and the inserted ICC is interrupted emulating an ICC withdrawal.

15 Claims, 4 Drawing Sheets

(58) Field of Classification Search
USPC .......................... 235/380, 492, 488, 375, 487
See application file for complete search history.

(56) References Cited

U.S. PATENT DOCUMENTS

| | | | | |
|---|---|---|---|---|
| 2006/0000917 A1* | 1/2006 | Kim | ................. | G06K 19/07733 |
| | | | | 235/492 |
| 2007/0220273 A1* | 9/2007 | Campisi | ............. | G06Q 20/3574 |
| | | | | 713/186 |
| 2014/0053256 A1* | 2/2014 | Soffer | ..................... | G06F 21/34 |
| | | | | 726/9 |
| 2018/0047014 A1* | 2/2018 | Maus | ................. | H04L 63/0853 |
| 2021/0035082 A1* | 2/2021 | Sherif | ................. | G06Q 20/204 |
| 2021/0306322 A1* | 9/2021 | Suraparaju | .......... | H04L 63/0861 |
| 2023/0216850 A1* | 7/2023 | Pasirstein | .............. | H04L 63/18 |
| | | | | 726/4 |

FOREIGN PATENT DOCUMENTS

| | | | | | |
|---|---|---|---|---|---|
| EP | 1484708 | A2 | 12/2004 | | |
| EP | 3671371 | A1 * | 6/2020 | ............. | H01Q 1/273 |
| WO | 2018137889 | A1 | 8/2018 | | |

* cited by examiner

ICC READER

TECHNICAL FIELD

The present invention relates to the technical field of readers for Integrated Chip Cards, ICCs, also known as "smartcards" especially compliant with the standard ISO/IEC 7816. In particular, the invention belongs to the use of these ICC readers in password less authentication processes and protocols aiming at implementing multifactor authentication.

In further embodiments, the invention envisages the use of authentication tokens wherein these ICC readers embed the ICC (e.g., in a non-removable manner) while support a standard Chip Card Interface Device, USB CCID, protocol. Advantageously, the authentication tokens according to the invention allow emulating the event (so-called user's response or challenge response) to be performed by the owner as required in some 2FA or 3FA protocols to continue the process.

BACKGROUND

Setting authentication protocols and access policies prevents unauthorized users from logging into and gain access to one or more protected computer resources such as an online services or applications. Depending on the level of security, stronger policies will be put in place to restrict, and protect, the access to critical resources from attackers.

Thus, the simplest authentication only requires one piece of evidence (or factor), typically a password. For additional security, the resource may require more than one factor to be supplied by the requesting user before granting access to the resource and be able to perform the desired action(s) according to an authorization policy. By using multiple-factor authentication, if one of the components is missing or supplied incorrectly, the user's identity cannot be established with sufficient certainty and the requested access shall be rejected if the user keeps failing for a pre-determined number of times in providing the correct piece of evidence.

Examples of multifactor authentications are the well-known two- or three-factor authentication (2FA, 3FA) that requires 2 or 3 of the following elements, respectively: something you have (e.g., something physical such as a token, smartcard, or key), something you know (e.g., password or PIN), something you are or you do (user's response based on, for instance, fingerprint, eye iris, voice, typing speed, pattern in key press intervals). In recent developments, for highly restricted resources, a four-factor authentication (4FA) also takes into account the geographical location or the accessing network of the user at that moment.

Aiming at preventing security breaches related to identity theft, organizations are focusing on stronger and easy-to-use authentication schemes such as the standardised one provided by the Fast IDentity Online, FIDO, Alliance for use convenience. FIDO2 standard enables users to capitalize on common devices (so-called "authenticators") to authenticate to online services in both desktop and mobile environments. Be the case as it may, FIDO2 standard is using public cryptographic materials with PKI-based solutions.

Web browsers such as Google Chrome, Microsoft Edge and Mozilla Firefox are currently supporting authentication through FIDO2 (including WebauthN specification and CTAP2 protocol). Moreover, Windows 10 Operating System is FIDO2 certified (since build 1909).

Concerning the FIDO2 standard, it defines 3 types of authenticators (or form factors):

A USB HID, that is a compact, tamper-evident USB with sensing means for user's presence detection that can be plugged-in into a PC or (mobile) phone.

ISO/IEC7816 or ISO14443, that is a smartcard format with or without a NFC-enabled communication antenna usable together with an insertable or wirelessly smartcard reader. The lack of sensing means makes necessary inserting, tapping or swiping the smartcard into or over the smartcard reader to validate the user's presence.

A handheld device including Bluetooth® interface (or Bluetooth Low Energy, BLE) for use cases when the USB connection is not available. This is less convenient and more expensive because requires an additional pairing operation to correctly operate with the PC or phone.

Obviously, the more extended one because of the lack of auxiliary equipment or additional settings is the FIDO USB HID device that implements a FIDO2 proprietary protocol (IDCore 3130 with FIDO2 applet) compliant with Federal Information Processing Standard, FIPS, and ICC certifications. In addition, this FIDO USB HID device comprises a separate microcontroller and imposes a very specific mini-form factor-format for the embedded smartcard. As mentioned, the sensitivity touch pad allows detecting user's presence but, unfortunately, this device does not include any NFC interface.

As an acknowledged problem of the industry, there is a shortage of semiconductors preventing consumer electronics, security, and service providers' companies from producing FIDO USB HID devices at the production rate roughly matching the market's demand. The smartcards of these FIDO USB HID devices are composed of a secured chip embedded into a surface mount package soldered into the token (no possibility to disassemble the package from the printed circuit board of the token).

Thus, giving the acceptance of FIDO2 and the drawbacks for authenticator's productions, it becomes apparent that there is a need in the industry for an alternative solution to meet the market forecasts.

A possible solution to this problem could be software-based but, unfortunately, it will require the development of specific USB drivers that, as known, depend on the OS platform. The skilled person would understand that software solution based on modifying drivers are not only difficult to develop, but also to support, and maintain across the different platforms user by the customers and service vendors.

SUMMARY

The present invention provides a solution for the aforementioned problems by an Integrated Chip Card, ICC, reader according to claim 1, an authentication token according to claim 8, a method for registering an end-user account with an online service according to claim 12, a method for authenticating an end-user account already registered with an online service according to claim 13, and a system for registering and authenticating an end-user account with an online service according to claim 14. In dependent claims, preferred embodiments of the invention are defined.

In a first inventive aspect, the invention provides an Integrated Chip Card, ICC, reader comprising:
- a microcontroller configured to exchange data with an insertable ICC while the insertable ICC is inserted and powered, and with an end-user entity,
- an ICC connector configured to allow the exchange of data between the microcontroller and the inserted ICC, and

an end-user entity interface connector configured to allow the exchange of data between the microcontroller and an end-user entity, wherein the ICC reader is characterized in that it further comprises an activatable 2-position built-in switch defining two states:

a first state wherein the exchange of data between the microcontroller and the inserted ICC is allowed, and a second state wherein the exchange of data between the microcontroller and the inserted ICC is interrupted emulating an ICC withdrawal.

The ICC reader is the terminal communication device or machine to which an insertable ICC (so-called smartcard, ISO/IEC 7816) can be electrically and operatively connected during operation. The insertable ICC can be subsequently removed or remain permanent as an embedded ICC. Preferably, the ICC reader is configured to permanently embed the insertable ICC after insertion.

As defined, the ICC reader acts as the interface between the ICC and the end-user entity that can be, in a further embodiment, a user's PC or (mobile) phone.

As requested for instance in FIDO2 standard, the 3FA precises a user's gesture to validate the user's presence. By using a conventional ICC reader, no user interaction can be performed because it lacks the touch sense. Thus, the only operation that a user could perform is simply to remove and re-insert the reader from the end-user entity port, but the FIDO2 application will consider that the authenticator was removed and the operation shall be aborted because the context of the operation was lost. As per today, the website browser supporting FIDO2 (through WebauthN specification) is not able to restore the context and provide a workaround to succeed authenticating.

Therefore, adding the activatable 2-position built-in switch to a conventional ICC reader permits emulating an ICC withdrawal and re-insertion for being compliant with the FIDO2 requirements.

In addition, certifying FIDO HID devices may become cumbersome because the complete device must be certified, i.e., the complete FIDO authenticator. Advantageously, by using standard ICC readers with a standard ICC, it is only necessary to certify the ICC and not the rest of the reader.

In a particular embodiment, not only the exchange of data between the microcontroller and the inserted ICC is interrupted in the second state but also the powering of the ICC.

In a particular embodiment, the ICC further stores and supports a FIDO applet.

In a particular embodiment, the activatable built-in switch is a push button, wherein the first and second states correspond to a pushed and non-pushed position, or vice-versa.

If the button is pushed, the ICC will be deactivated simulating a smartcard removal and, when relieved afterwards, the re-insertion will be emulated.

Alternatively, in a particular embodiment, the activatable built-in switch is an on/off switch, the on position corresponding to the first state and the off position to the second state.

In a particular embodiment, the activatable built-in switch is biased to the position corresponding to the first state, such as the un-pushed position for the push button or the on position for the on/off switch, the built-in switch being maintained on the second state as long as an active user's interaction.

Advantageously, it envisages future particulars about any timing required for the user's validation by further developments of any FIDO protocol.

In a particular embodiment, the ICC reader is a USB host adapted to embed the ICC as a non-removable USB-ICC connected to the ICC connector of the USB host.

In a particular embodiment, the ICC reader is configured to support a Chip Card Interface Device, CCID, protocol with the insertable ICC and the end-user entity. Preferably, the ICC reader is configured to support a USB CCID protocol.

In a particular embodiment, the activatable 2-position built-in switch is operatively connected to an ICC detection switch of the ICC connector to send a command to the microprocessor upon shifting to the second state for emulating an interruption of the data exchange with the inserted ICC.

In an alternative embodiment, the activatable 2-position built-in switch is operatively connected to the microprocessor and is configured to send a command to the microprocessor for interrupting the data exchange with the inserted ICC upon shifting to the second state.

In another alternative embodiment, the activatable 2-position built-in switch is operatively connected to an interrupt-IN endpoint connector of the ICC connector to send an interruption command from the inserted ICC to the microprocessor upon shifting to the second state for emulating an interruption of the data exchange with the inserted ICC.

As known, the interrupt-IN endpoint is used by USB CCID devices when the smartcard is inserted/removed into/from the card slot. This insertion/withdrawal creates a card insertion/withdrawal event using the USB interrupt-IN endpoint according to the USB CCID specification. Therefore, when using a USB CCID specification, the activatable 2-position built-in switch will emulate such a USB CCID event.

In a second inventive aspect, the invention provides an authentication token comprising:

the ICC reader according to any of the embodiments of the first inventive aspect, and an inserted ICC configured to allow the exchange of data with the microcontroller of the ICC reader through the ICC connector.

In a particular embodiment, the inserted ICC is a Fast IDentity Online2, FIDO2, compliant smartcard.

In a particular embodiment, the FIDO2 compliant smartcard is configured to generate pairs of Elliptic Curve Digital Signature Algorithm, ECDSA, keys bound to at least a relying party identity and an end-user account.

In a particular embodiment, the FIDO2 compliant smartcard has a Subscriber Identity Module, SIM, form factor.

Advantageously, using the standardised SIM card format makes it is easier to produce than MMF form factor which is, in addition, a semiconductor package. Nevertheless, in an alternative embodiment, the FIDO2 compliant smartcard has a MMF form factor.

In a third inventive aspect, the invention provides a method for registering an end-user account with an online service, the method comprising:

providing an authentication token according to any of the embodiments of the second inventive aspect;

receiving, by an end-user entity being configured to communicate with a relying party providing the online service, the credentials of the end-user account;

connecting the authentication token to an end-user entity through the end-user entity interface;

shifting the activatable 2-position built-in switch of the connected authentication reader at least from the second state to the first state;

generating, by the authentication token, a cryptographic key pair unique for the authentication device, the online service and the end-user account to be registered;

sending, by the authentication token to the relying party through the end-user entity, the public key;

registering, by the relying party, the end-user account by storing the end-user account associated with the public key.

As known, introducing further credentials or passwords such as a Personal Identification Number (PIN) may be optional and it depends on relaying party policy. For instance, it is not supported in U2F protocol; but strongly recommended for relying parties that supports CTAP2.0 protocol. In addition, its use will become further encouraged with the CTAP2.1 specification.

Therefore, in a particular embodiment, after shifting the activatable 2-position built-in switch and before generating the cryptographic key pair, the method comprises the following step:

receiving by the end-user entity, a Personal Identification Number, PIN, associated or to be associated with the end-user account and sending the PIN to authentication token.

In a fourth inventive aspect, the invention provides a method for authenticating an end-user account already registered with an online service, the method comprising:

providing an authentication token according to any of the embodiments of the second inventive aspect;

receiving, by an end-user entity being configured to communicate with a relying party providing the online service, the credentials of the end-user account;

connecting the authentication token to an end-user entity through the end-user entity interface;

creating a challenge response by shifting the activatable 2-position built-in switch of the connected authentication reader at least from the second state to the first state;

retrieving, by the authentication token, the private key associated with the online service and the end-user account to be registered;

signing, by the authentication token, the challenge response;

sending, by the authentication token to the relying party through the end-user entity, the signed challenge response; and verifying, by the relying party, the signed challenge response with the public key stored and, if both matches, authenticating the end-user account.

As mentioned, the use of the PIN or any other password may be optional and according to the relaying party policy. Therefore, in a particular embodiment, the private key associated with the online service and the end-user account to be registered is only retrieved by the authentication token if the PIN associated with the end-user account is verified by the authentication token. Thus, the PIN is received by the end user entity and forwarded to the authentication token for its verification.

In a fifth inventive aspect, the invention provides a system for registering and authenticating an end-user account with an online service, the system comprising:

an authentication token according to any of the embodiments of the second inventive aspect;

an end-user entity being configured to communicate with a relying party providing the online service; and the relying party, wherein the relying party is configured to store public keys each associated to an end-user account.

The Relying Party may be a web site or other entity that uses a FIDO protocol to directly authenticate users (i.e., it performs peer-entity authentication).

In a particular embodiment, the system further comprises a FIDO server accessible through the end-user entity and configured to store metadata of the authentication token such as form factors, characteristics, and capabilities for verification purposes.

Particularly, the FIDO Server is a server software typically deployed in the relying party's infrastructure that meets UAF protocol server requirements.

In a particular embodiment, the FIDO server is configured to access a FIDO Alliance Metadata Service (MDS) that stores the authentication token metadata. More particularly, the FIDO Alliance Metadata Service is a centralized repository of the Metadata Statement that is used by the relying parties to validate authenticator attestation and prove the genuineness of the device model. Therefore, the FIDO Server downloads the metadata from the Metadata Service.

Accordingly, the relying party can decide whether it wants to use the metadata service (via the FIDO server) and whether or not it wants to accept certain authenticators for registration or authentication.

In this regard, if FIDO is composed with federated identity management protocols (e.g., SAML, OpenID Connect, etc.), the identity provider will also be playing the role of a FIDO Relying Party.

In a preferred embodiment, the metadata further comprises information relative to historical interactions of the authentication tokens with the relying party and policy decisions made by the relying party about the authentication tokens.

All the features described in this specification (including the claims, description and drawings) and/or all the steps of the described method can be combined in any combination, with the exception of combinations of such mutually exclusive features and/or steps.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION

As it will be appreciated by one skilled in the art, aspects of the present invention may be embodied as an ICC reader, as an authentication token, as a method or as a system.

Figure 1:
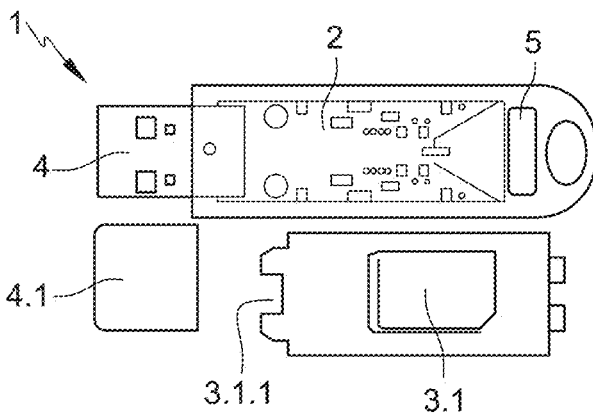
FIG. 1 shows a schematic representation of an embodiment of an ICC reader according to the invention.

FIG. 1 depicts an embodiment of an Integrated Chip Card, ICC, reader 1 that comprises a microcontroller 2, an ICC connector 3 (not shown, see FIGS. 2*a* and 2*b* instead), an end-user entity interface connector 4 and an activatable 2-position built-in switch 5.

A standalone ICC 6 (so-called smartcard, ISO/IEC 7816) can be inserted into this ICC reader 1 (so-called terminal communication device) in order to be electrically and operatively connected thereto. The ability of being "inserted" means that can be afterwards removed if so wished (conversely, the ICC 6 may remain permanently inserted). In other words, that the ICC or smartcard is not intended to be soldered to the printed circuit board, PCB, of the ICC reader 1.

As it can be appreciated in FIG. 1, the ICC reader 1 further comprises a lid or cover 3.1 for facilitating the placement or insertion of the ICC 6 into the ICC reader 1. This lid 3.1—together with the inserted ICC 6 (with the ICC contacts facing inwards, i.e., towards the ICC connector 3)—is to be subsequently brought together with the ICC connector 3 of the ICC reader 1 to allow the exchange of data between the microcontroller 2 and the inserted ICC 6 thanks to ISO/IEC 7816 standardized contacts. In a particular embodiment, this lid 3.1 further comprises a hinge 3.1.1 connected to the ICC reader 1 in order to facilitate its pivoting and ease physical insertion/removal of the ICC 6.

It is to be noted that, for sake of clearness in FIG. 1, the lid 3.1 is depicted disassembled while the ICC connector 3 is positioned on the hidden rear face of the ICC reader 1.

The end-user entity interface connector 4 of the ICC reader 1 permits the physical and electrical connection or plug-in between the ICC reader and an end-user entity 11 such as a personal laptop or PC in order to allow the exchange of data between its microcontroller 2 and the end-user entity 11.

Without limiting the invention, in this particular figure the ICC reader 1 is a USB host adapted to embed the ICC as a non-removable USB-ICC connected to the ICC connector of the USB host. Thus, the end-user entity interface connector 4 is depicted as a USB connector plug.

In addition, the depicted ICC reader in the form of a USB host supports a USB CCID protocol with the insertable ICC 6 and the end-user entity 11.

As known, depending on the type of USB connector plug, different powering and data paths may be envisaged. Actually, depending on the type and size of the USB connectors, the ICC reader in form of USB host can be used with desktop or portable equipment, with mobile equipment, or even with low-profile mobile equipment such as mobile phones and tablets. In other words, the end-user entity 11 may be either a desktop or portable equipment, a mobile equipment, or a low-profile mobile equipment.

Accordingly, the ICC reader 1 further comprises a cap 4.1.1 to protect the end-user entity interface connector 4 while not in use. The cap 4.1.1 is adapted to snap in the connector 4 and hence it has corresponding dimensions.

Furthermore, the activatable 2-position built-in switch 5 of the ICC reader 1 defines two states:

a first state wherein the exchange of data between the microcontroller and the inserted ICC is allowed, and
a second state wherein the exchange of data between the microcontroller and the inserted ICC is interrupted emulating an ICC withdrawal.

In this particular embodiment, this activatable built-in switch 5 is a push button. Thus, the first and second states correspond to a pushed and non-pushed position, or vice-versa.

Nevertheless, the skilled person shall realize that, alternatively, the activatable built-in switch 5 may be an on/off switch, the on position corresponding to the first state and the off position to the second state.

In addition, either of these types of switch 5 may be biased to the position corresponding to the first state, the built-in switch being maintained on the second state as long as an active user's interaction persists.

Thus, when the ICC 6 or smartcard is inserted and powered, the microcontroller 2 of the plugged ICC reader 1 can allow the exchange of data between the ICC 6 and the end-user entity 11 if the activatable built-in switch 5 is not in the second position. The combination of an inserted ICC 6 and an ICC reader 1 as described gives rise to an authentication token 10 as shown in FIG. 2*a* or 2*b*.

Figure 2A:
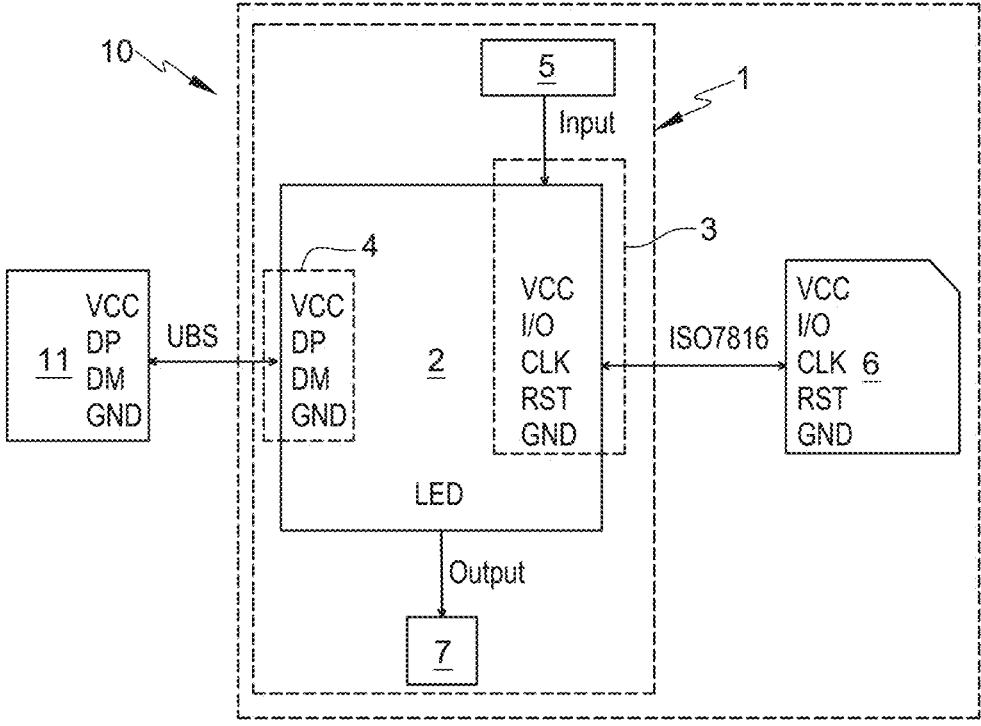
FIGS. 2a and 2b show a functional block diagram and an electric scheme of an embodiment of an authentication token according to the invention.
Figure 2B:
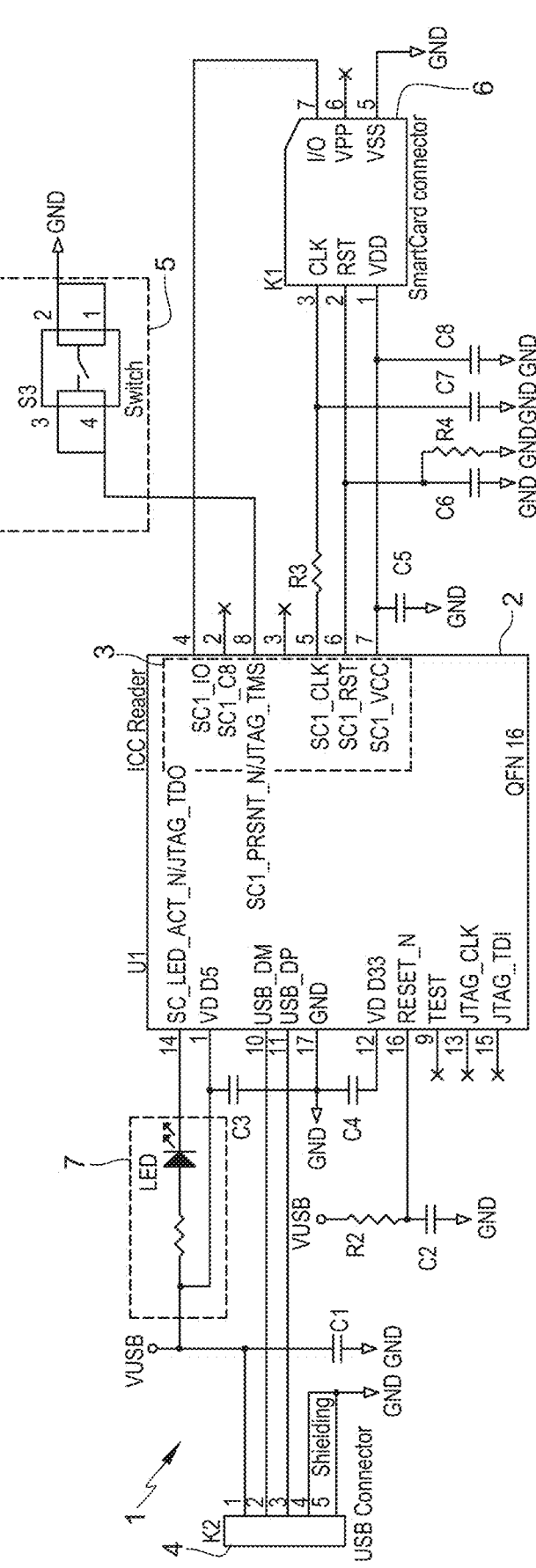

FIGS. 2*a* and 2*b* depict a functional block diagram and an electric scheme of an embodiment of an authentication token 10 according to the invention, respectively.

As it can be observed from FIG. 2*a*, the microcontroller 2, the ICC connector 3 and the end-user entity interface connector 4 are all soldered to the PCB of the ICC reader 1. In a particular embodiment, both the microcontroller 2 and the ICC connector 3 form part of the same ICC reader chip.

As the skilled person will recognize, the microcontroller 2, the ICC connector 3 and the end-user entity interface connector 4 may be (physically) interconnected differently as depicted while still interplaying in the same manner.

As depicted, the activatable 2-position built-in switch 5 is operatively connected to an ICC detection or smartcard presence switch (see pin SC1_PRSNT_N/JTAG_TMS in FIG. 2*b*) within the ICC connector 3 in order to send a command to the microprocessor 2 upon shifting to the second state for emulating an interruption of the data exchange with the inserted and powered ICC 6.

In alternative embodiments (not shown), the activatable 2-position built-in switch 5 may be operatively connected to the microprocessor 2 in order to send a direct command for interrupting the data exchange with the inserted ICC 6 upon shifting to the second state. Alternatively, the activatable 2-position built-in switch 5 may be operatively connected to an interrupt-IN endpoint connector of the ICC connector 3 to send an interruption command from the inserted ICC 6 to the microprocessor upon shifting to the second state for emulating or "faking" a physical interruption of the data exchange with the inserted ICC.

In addition to the abovementioned components, the ICC reader may further comprise a light emitting diode, LED 7, configured to indicate, for instance, when the ICC 6 or smartcard is exchanging data with the end-user entity 11. That is, provided that the activatable built-in switch 5 is not in the second position.

Advantageously, this helps the user to perform correctly the user's challenge needed for multifactor authentication.

In FIG. 2*b*, it can be observed a detailed electric scheme of an embodiment of an authentication token 10.

In this particular example, the ICC connector 3 comprises a plurality of pins of the chip of the ICC reader 1 where the microcontroller 2 is mounted on:

"SC1_C8": This pins is used for either standard or proprietary use as an input and/or output.

SC1_IO: The input/output reference for communication with the smartcard's data.

"SC1_PRSNT_N/JTAG_TMS": Active-low signals used to detect the smartcard device. This pin pull-up which is activated/deactivated by software to simulate the smartcard insertion/removal.

"SC1_C4": This pin is to attach to C4 of the smartcard in case the card supports Function Code.

SC1_CLK: The clock reference for communication with the smartcard's clock.

"SC1_RST": A low pulse that resets the card and triggers an "answer to reset" (ATR) response message. This pin should be held low when the interface is not active.

"SC1_VCC": The voltage supply pin, where the output of the pin can be set to 1.8, 3.0, or 5.0 volts, depending on the type of smartcard detected.

Thus, the activatable 2-position built-in switch 5 is connected through the pin SC1_PRSNT_N/JTAG_TMS within the ICC connector 3 being thus configured to send a command to the microcontroller 2 upon shifting to the second state for emulating an interruption of the data exchange with the inserted and powered ICC 6.

In addition, the LED 7 is connected to the microcontroller 2 through the pin referred to as "SC_LED_ACT_N/JTAG_TDO" on the chip.

As the skilled person will realize, the rest of the device operation is similar to a standard smartcard reader. In particular, the ICC reader 1 supports a USB CCID protocol and, therefore, by using the ICC reader according to the invention there is no need to use FIDO2 proprietary protocol (IDCore 3130 with FIDO2 applet) like in FIDO HID devices.

The activatable 2-position built-in switch 5 is by default in the first state, stating that the smart card is inserted. Thus, the end-user entity 11 is configured to exchange data with the ICC or smartcard 6 via a PC/SC specification for security operations.

Figure 3:
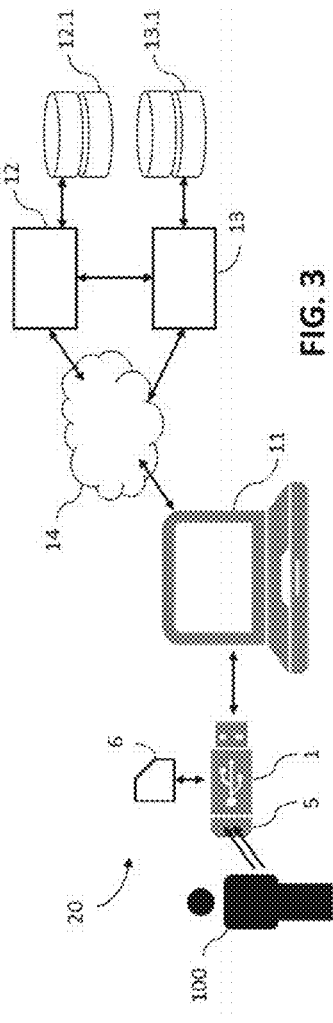
FIG. 3 shows an schematic representation of an embodiment of a system for registering and authenticating an end-user account with an online service according to the invention.

FIG. 3 depicts a schematic representation of an embodiment of a system 20 for registering and authenticating an end-user account with an online service.

The depicted system 20 comprises:

an authentication token 10 in turn comprising the ICC reader 1 in the form of a USB host embedding the insertable ICC 6 as a non-removable USB-ICC connected to the ICC connector 3 of the USB host;

an end-user entity 11 in the form of e.g., a laptop being configured to communicate with a relying party 12 providing the online service through a communication network 14;

the relying party 12 configured to store public keys each associated to an end-user account in a database 12.1; and a FIDO server 13 accessible by the relying party 12 is configured to store metadata of the authentication token 11 in a database 13.1.

As mentioned, the FIDO Server 13 is typically deployed in the relying party's infrastructure that meets UAF protocol server requirements. Thus, it may be accessible by the relying party 12 through either the wireless or wired communication network 14.

As mentioned, this metadata may comprise form factors, characteristics, capabilities for verification purposes, information relative to historical interactions of the authentication tokens 10 with the relying party 12 and/or policy decisions made by the relying party 12 about the authentication tokens 10. In particular, the database 13.1 is a FIDO Alliance Metadata Service (MDS) that stores the authentication token metadata.

At a client side, the system 20 comprises the authentication token 10 and the end-user entity 11 and, at the server side, a (remote) server of the relying party 12 and a (remote) FIDO server 13. The authentication token 10 belongs to the user and, namely, the user can operate the activatable 2-position built-in switch 5 of the ICC reader 1. The end-user entity 11 may be of exclusive use of the user or be a public/private entity (laptop, PC, mobile phone, tablet, etc.) accessible by more than one users pertaining or not to a particular group.

In the following example, it will be assumed that the insertable ICC 6 in indeed inserted in the USB host and further stores and supports a FIDO applet. In addition, for exemplary purposes, the ICC 6 is a FIDO2 compliant smartcard with a SIM form factor.

The end-user entity 11 comprises memory(ies) that stores an Operating System (or OS) such as Windows 10 as well as local application(s). The local application allows carrying out, on-line and/or off-line (i.e. not connected to the remote server side), one or several operations to be requested by the user 1.

Thanks to these applications, the end-user entity 11 e.g., in form of a PC or laptop enables the user to access a service (either a website or an online/offline service) in a desktop environment, for instance, through web browsers or through the relying party application itself.

The browser used for accessing the online service shall support the W3C standard of Web Authentication API (also known as WebAuthn) which is a specification written by the W3C and FIDO, with the participation of Google, Mozilla, Microsoft, Yubico, etc. The API allows relying party servers to register and authenticate users using public key cryptography instead of a password.

Alternative, if a relying party application is directly used without a web browser, this APP shall support APP calls for FIDO Authn. as well.

The communication network 14 to communicate the end-user entity 11 with the remote server(s) 12 may include a secure communication protocol over a computer network or a mobile radio-communication network(s). Additionally or alternately, the communication network(s) 14 may include a WLAN (acronym for "Wireless Local Area Network"), an Internet and/or Intranet type network(s). For instance, the communication network 14 may be Hypertext Transfer Protocol Secure (HTTPS) over Transport Layer Security (TLS). The communication network(s) 14 may be accessed alternatively, from the end-user entity 11, through a Short Range radio-communication link(s).

Alternatively, i.e. instead of a wireless link(s), or additionally, the end-user entity 11 may be connected, through a wire(s) or a cable(s) (not represented), to the server 12.

The relying party server 12 is connected, over a bi-directional link, through the communication network(s) 14, to the end-user entity 11 that plays a role of a client device(s).

For exemplary purposes, only a single server 12 has been represented for the relying party providing the online service. This server 12 is configured to carry out a registration operation and a personalization operation for one or several user accounts.

Nevertheless, according to another embodiment (not represented), instead of a single server 12, two or more servers are involved to carry out notably a registration operation and/or a personalization operation that are both carried out by the server 12.

The FIDO server 13 is also connected, over another or the same bi-directional link, through the communication network(s) 14, to the relying party server 12. Additionally or alternatively, the relying party server 12 may be directly connected to the FIDO server 13.

Figure 4:
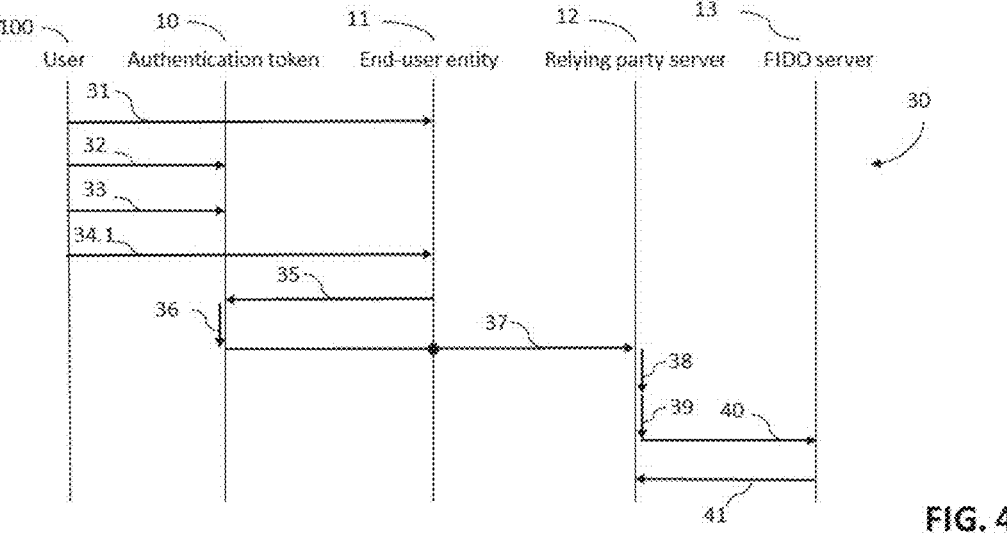
FIG. 4 shows an schematic representation of an embodiment of a method for registering and authenticating an end-user account with an online service according to the invention.
Figure 5:
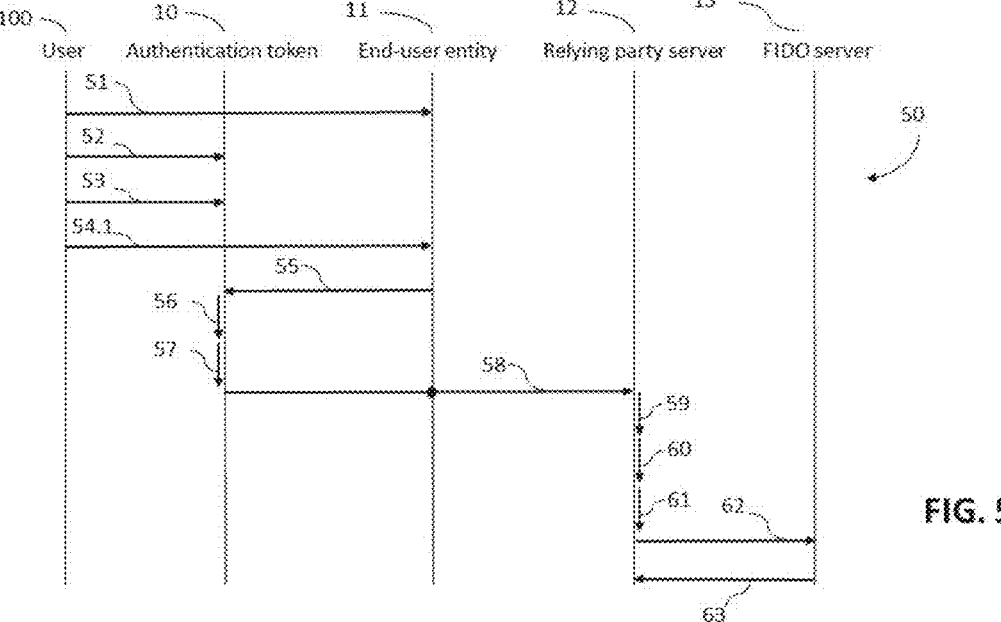
FIG. 5 shows an schematic representation of an embodiment of a method for registering and authenticating an end-user account with an online service according to the invention.

FIGS. 4 and 5 depict the main steps of methods for registering and authenticating an end-user account with an online service, respectively, using the system according to FIG. 3. The FIDO server is optional.

In this figures, it will be assumed that the user 100 has been already logged in the end-user entity 11 (e.g., his working or personal laptop) to start session (if needed). For exemplary purposes, the user will access the online service via web browser.

In FIG. 4, the method 30 comprises the following steps:

receiving 31, by the end-user entity 11 the credentials of the end-user account to be registered;

connecting 32 or plugging the authentication token 10 to the end-user entity 11 though the end-user entity interface;

shifting 33 the activatable 2-position built-in switch of the connected authentication token at least from the second state to the first state;

receiving 34.1 by the end-user entity 11, a Personal Identification Number, PIN, already associated or to be associated with the end-user account and sending 35, by the end-user entity 11, the PIN to the authentication token 10;

generating 36, by the authentication token 10, a cryptographic key pair unique for the authentication token 10, the online service and the end-user account to be registered;

sending 37, by the authentication token 10 to the relying party server 12 through the end-user entity 11, the public key;

registering 38, by the relying party server 12, the end-user account by storing 39 the end-user account associated with the public key in its database 12.1.

Optionally, the relying party server 12 may send 40 to the FIDO server 13 a request to verify metadata about the authentication token 10 in the repository of the FIDO Alliance Metadata Service 13.1, and the subsequent response 41 with the verification result.

As mentioned, the introduction of the PIN is optional but nevertheless highly recommended in order to prevent malware attack.

In FIG. 5, the method 50 comprises the following steps:

receiving 51, by the end-user entity 11 from the user 100 the credentials of the end-user account;

connecting 52 the authentication token 10 to the end-user entity 11 though the end-user entity interface by the user;

creating by the user 100 a challenge response 53 by shifting the activatable 2-position built-in switch of the connected authentication token 10 at least from the second state to the first state;

receiving 54.1 by the end-user entity 11, the PIN associated with the end-user account and sending 55 the PIN to the authentication token 10 for its verification;

if the PIN is verified, retrieving 56, by the authentication token 10, the private key associated with the online service and the registered end-user account, signing 57, by the authentication token 10, the challenge response;

sending 58, by the authentication token 10 to the relying party server 12 through the end-user entity 11, the signed challenge response; and retrieving 59, by the relying party server 12, the public key stored in its database 12.1; and verifying 60, by the relying party server 12, the signed challenge response with the public key retrieved and, if both matches, authenticating 61 the end-user account.

Optionally, the relying party server 12 may send 62 to the FIDO server 13 a request to verify metadata about the authentication token 10 in the repository of the FIDO Alliance Metadata Service 13.1, and the subsequent response 63 with the verification result.

For illustrative purposes, the process of metadata verification has been depicted at the end of the methods 40 and 50 because it can be an independent verification process. Nevertheless, the skilled person may recognize that it can be carried out as well at other intermediate stages of these methods 40 and/or 50.

Briefly, the relying party 12 configures its registration policy to allow only authentication tokens matching certain characteristics to be registered. Therefore, the FIDO Server verifies that the authenticator meets the originally supplied registration policy based on its authoritative metadata statement. This prevents the registration of unexpected authenticator models.

As mentioned before, the introduction of the PIN may be optional and depends on the relying party policy.

When the user's presence is required by the online service, a message is displayed to the user 100 in the application environment of the web browser sent by the relying party 12. Then, the switch 5 is activated by the user 100 to confirm his/her presence and will electrically simulate the smartcard withdrawal. This simulated smartcard 6 withdrawal is transmitted through the USB host 10 to the end-user entity 11 by a notification. Finally, the online service (ultimately, the relying party 12) using the smartcard will be notified of a withdrawal.

Afterwards, when the switch 5 is released by the user 100, it will electrically simulate the smartcard insertion which is again transmitted through the authentication token 10 to the end-user entity 11 by a notification. Finally, the online service (ultimately, the relying party 12) using the smartcard 6 will be notified of an insertion this confirming the user's presence.

The invention claimed is:

1. An Integrated Chip Card, ICC, reader comprising:

a microcontroller, provides a hardware-based user-presence confirmation compliant with FIDO2 authentication requirements, configured to exchange data with an insertable ICC while the insertable ICC is inserted and powered, and with an end-user entity, an ICC connector configured to allow the exchange of data between the microcontroller and the inserted ICC, and an end-user entity interface connector configured to allow the exchange of data between the microcontroller and an end-user entity, wherein the ICC reader further comprises an activatable, user-operable, 2-position built-in switch defining two states:

a first state wherein the exchange of data between the microcontroller and the inserted ICC is allowed, and a second state wherein the exchange of data between the microcontroller and the inserted ICC is interrupted emulating an ICC withdrawal.

2. The ICC reader according to claim 1, wherein the activatable built-in switch is:

a push button, wherein the first and second states correspond to a pushed and non-pushed position, or vice-versa, or an on/off switch, the on position corresponding to the first state and the off position to the second state.

3. The ICC reader according to claim 1, wherein the activatable built-in switch is spring-biased to the position corresponding to the first state, such as the un-pushed position for the push button or the on position for the on/off switch, the built-in switch being maintained on the second state as long as an active user's interaction.

4. The ICC reader according to claim 1, wherein the ICC reader is a USB host adapted to embed the ICC as a non-removable USB-ICC connected to the ICC connector of the USB host.

5. The ICC reader according to claim 4, wherein the ICC reader is configured to support a Chip Card Interface Device, USB CCID, protocol with the insertable ICC and the end-user entity.

6. The ICC reader according to claim 1, wherein the activatable 2-position built-in switch is operatively connected to the microprocessor and is configured to send a command to the microprocessor for interrupting the data exchange with the inserted ICC upon shifting to the second state.

7. The ICC reader according to claim 1, wherein the activatable 2-position built-in switch is operatively connected to an interrupt-IN endpoint connector of the ICC connector to send an interruption command from the inserted ICC to the microprocessor upon shifting to the second state for emulating an interruption of the data exchange with the inserted ICC.

8. An authentication token comprising:
the ICC reader according to claim 1, and
an inserted ICC configured to allow the exchange of data with the microcontroller of the ICC reader through the ICC connector.

9. The authentication token according to claim 8, wherein the inserted ICC is a Fast IDentity Online2, FID02, compliant smartcard.

10. The authentication token according to claim 9, wherein the FIDO2 compliant smartcard is configured to generate pairs of Elliptic Curve Digital Signature Algorithm, ECDSA, keys bound to at least a relying party identity and an end-user account.

11. The authentication token according to claim 10, wherein the FIDO2 compliant smartcard has a Subscriber Identity Module, SIM, form factor or a MFF form factor.

12. System for registering and authenticating an end-user account with an online service, the system comprising:
an authentication token according to claim 8;
an end-user entity being configured to communicate with a relying party providing the online service; and
the relying party, wherein the relying party is configured to store public keys each associated to an end-user account.

13. System according to claim 12, wherein the system further comprises a FIDO server accessible by the relying party and configured to store metadata of the authentication token such as form factors, characteristics, and capabilities for verification purposes.

14. Method for registering an end-user account with an online service, the method comprising:
providing an authentication token;
receiving, by an end-user entity being configured to communicate with a relying party providing the online service, the credentials of the end-user account;
connecting the authentication token to an end-user entity though the end-user entity interface;
shifting the activatable 2-position built-in switch of the connected authentication token at least from the second state to the first state;
generating, by the authentication token, a cryptographic key pair unique for the authentication token, the online service and the end-user account to be registered;
sending, by the authentication token to the relying party through the end-user entity, the public key;
registering, by the relying party, the end-user account by storing the end-user account associated with the public key.

15. Method for authenticating an end-user account already registered with an online service, the method comprising:
providing an authentication token;
receiving, by an end-user entity being configured to communicate with a relying party providing the on line service, the credentials of the end-user account;
connecting the authentication token to an end-user entity though the end-user entity interface;
creating a challenge response by shifting the activatable 2-position built-in switch of the connected authentication token at least from the second state to the first state;
retrieving, by the authentication token, the private key associated with the online service and the registered end-user account,
signing, by the authentication token, the challenge response;
sending, by the authentication token to the relying party through the end-user entity, the signed challenge response; and
verifying, by the relying party, the signed challenge response with the public key stored and, if both matches, authenticating the end-user account.

* * * * *